(12) United States Patent
Fernandes Goncalves et al.

(10) Patent No.: US 9,768,659 B2
(45) Date of Patent: Sep. 19, 2017

(54) SECONDARY PART OF A SYNCHRONOUS MOTOR HAVING A PROTECTIVE DEVICE FOR MAGNETS

(71) Applicant: ETEL S.A., Môtiers (CH)

(72) Inventors: José Manuel Fernandes Goncalves, Colombier (CH); Jean-Yves Grillon, Granges-Narboz (FR)

(73) Assignee: ETEL S.A., Môtiers (CH)

( * ) Notice: Subject to any disclaimer, the term of this patent is extended or adjusted under 35 U.S.C. 154(b) by 286 days.

(21) Appl. No.: 14/735,551

(22) Filed: Jun. 10, 2015

(65) Prior Publication Data

US 2015/0364965 A1    Dec. 17, 2015

(30) Foreign Application Priority Data

Jun. 11, 2014   (EP) ..................... 14171949

(51) Int. Cl.
| | |
|---|---|
| *H02K 1/18* | (2006.01) |
| *H02K 5/10* | (2006.01) |
| *H02K 41/03* | (2006.01) |
| *H02K 1/17* | (2006.01) |

(52) U.S. Cl.
CPC ............ *H02K 5/10* (2013.01); *H02K 41/031* (2013.01); *H02K 1/17* (2013.01); *H02K 2201/03* (2013.01)

(58) Field of Classification Search
CPC .. H02K 1/17; H02K 1/18; H02K 1/28; H02K 41/031–41/033
See application file for complete search history.

(56) References Cited

U.S. PATENT DOCUMENTS

| | | | | |
|---|---|---|---|---|
| 4,827,163 | A * | 5/1989 | Bhate ..................... | H02K 35/02 310/13 |
| 5,642,013 | A | 6/1997 | Wavre | |
| 5,952,742 | A | 9/1999 | Stoiber et al. | |
| 6,882,065 | B2 | 4/2005 | Morel et al. | |
| 7,030,530 | B2 * | 4/2006 | Malmberg ............ | H02K 1/278 310/154.01 |
| 2008/0093945 | A1 * | 4/2008 | Gruenhagen .......... | H02K 1/278 310/156.19 |
| 2009/0256435 | A1 * | 10/2009 | Gottfried ............... | H02K 1/278 310/61 |
| 2012/0007453 | A1 * | 1/2012 | Leiber ..................... | H02K 1/18 310/43 |
| 2014/0062223 | A1 | 3/2014 | Park et al. | |
| 2014/0084734 | A1 * | 3/2014 | Ishigami ................. | H02K 1/24 310/156.48 |

FOREIGN PATENT DOCUMENTS

JP    2009-038869    2/2009

* cited by examiner

*Primary Examiner* — Ramon M Barrera
(74) *Attorney, Agent, or Firm* — Andrews Kurth Kenyon LLP

(57) ABSTRACT

A secondary part of a synchronous motor has a protective device for magnets. The secondary part has a plurality of magnets evenly spaced on a magnet support. The protective device has a web for insertion into the gap between adjacent magnets. The web has a first and second flange at its two ends, so that the web and the flanges form a double-T structure, and the flanges rest against outer edges of the adjacent magnets.

15 Claims, 4 Drawing Sheets

SECONDARY PART OF A SYNCHRONOUS MOTOR HAVING A PROTECTIVE DEVICE FOR MAGNETS

CROSS-REFERENCE TO RELATED APPLICATIONS

The present application claims priority to Application No. 14171949.2, filed in the European Patent Office on Jun. 11, 2014, which is expressly incorporated herein in its entirety by reference thereto.

FIELD OF THE INVENTION

The present invention relates to a secondary part of a synchronous motor, having a protective device for magnets. Such protective devices are used to protect the magnets of the magnetic path of a synchronous motor from damage due to external influences.

BACKGROUND INFORMATION

Synchronous motors, which include a primary part having coils and a secondary part having permanent magnets, have been known for a long time. For example, U.S. Pat. No. 5,642,013 describes synchronous motors in which magnets are placed in evenly spaced fashion and with alternating polarity on a magnetic path. Opposite this magnetic path is a primary part, on whose teeth coils are wound. In response to suitable energizing of the coils, a force is able to be generated between the primary part and the secondary part which drives the synchronous motor. The magnetic paths may be disposed on the lateral surface of a cylinder in order to form a rotary motor, or along a straight line in order to form a linear motor. The magnetic paths may also extend along curved paths, such as in a transport system, for example, to move movable carriages having an integrated primary part along any paths as desired.

The magnetic paths of such synchronous motors are very sensitive. The magnets can corrode, for example, if they come in contact with liquids. In addition, they are susceptible to mechanical damage. This is a problem primarily in machine tools, where ferromagnetic particles accrue in large quantities, are attracted by the magnets and can block the air gap between the primary part and the secondary part of the motor.

Thus, for example, U.S. Pat. No. 5,952,742 describes covering the magnetic path of a linear motor with a metallic strip. In addition, the magnets are surrounded by a lateral frame, so that they are protected from all sides.

U.S. Pat. No. 6,882,065 describes cover strips, which are disposed on both sides of the magnetic path of a linear motor. They protect the magnets laterally against harmful influences. On their upper side, these cover strips have a bar whose height corresponds to the thickness of a cover plate. The bars of two opposite cover strips thus form a channel which accommodates and guides the cover plate for covering the magnets. The plate is thus relatively easy to mount. A ferromagnetic plate is held in place by the attractive force of the magnets and does not have to be further secured.

Japanese Published Patent Application No. 2009-38869 describes spacers disposed between the magnets of a magnetic path. These spacers prevent direct contact of the magnets to one another. They also support a cover plate which, due to the spacers, is not in direct contact with the magnets. Forces on the cover plate thus do not affect the magnets.

SUMMARY

Example embodiments of the present invention simplify and inexpensively implement the protection of the magnets of a secondary part of a synchronous motor.

According to an example embodiment of the present invention, a secondary part of a synchronous motor includes a protective device for magnets. The secondary part has a plurality of magnets evenly spaced on a magnet support. The protective device has a web or bar for insertion into a gap between adjacent magnets. The web has first and second flanges at its two ends, so that the web and the flanges form a double-T structure, and the flanges rest against outer edges of the adjacent magnets.

The protective device described is inexpensive, is uncomplicated to produce, and may easily be installed, maintained, or replaced on-site at the location of the customer. It stabilizes the magnet array, and protects the often quite brittle magnets from the influence of lateral forces and from the intrusion of dirt. In addition, it offers reliable support for a cover. Due to its configuration, the protective device may be used for a large range of shapes of the gap between two magnets, so that fewer specially manufactured components are necessary. The protective device is suitable both for linear motors having straight or curved paths, and for rotary motors.

Further features and aspects of example embodiments of the present invention are described in more detail below with reference to the appended Figures.

DETAILED DESCRIPTION

Figure 1:
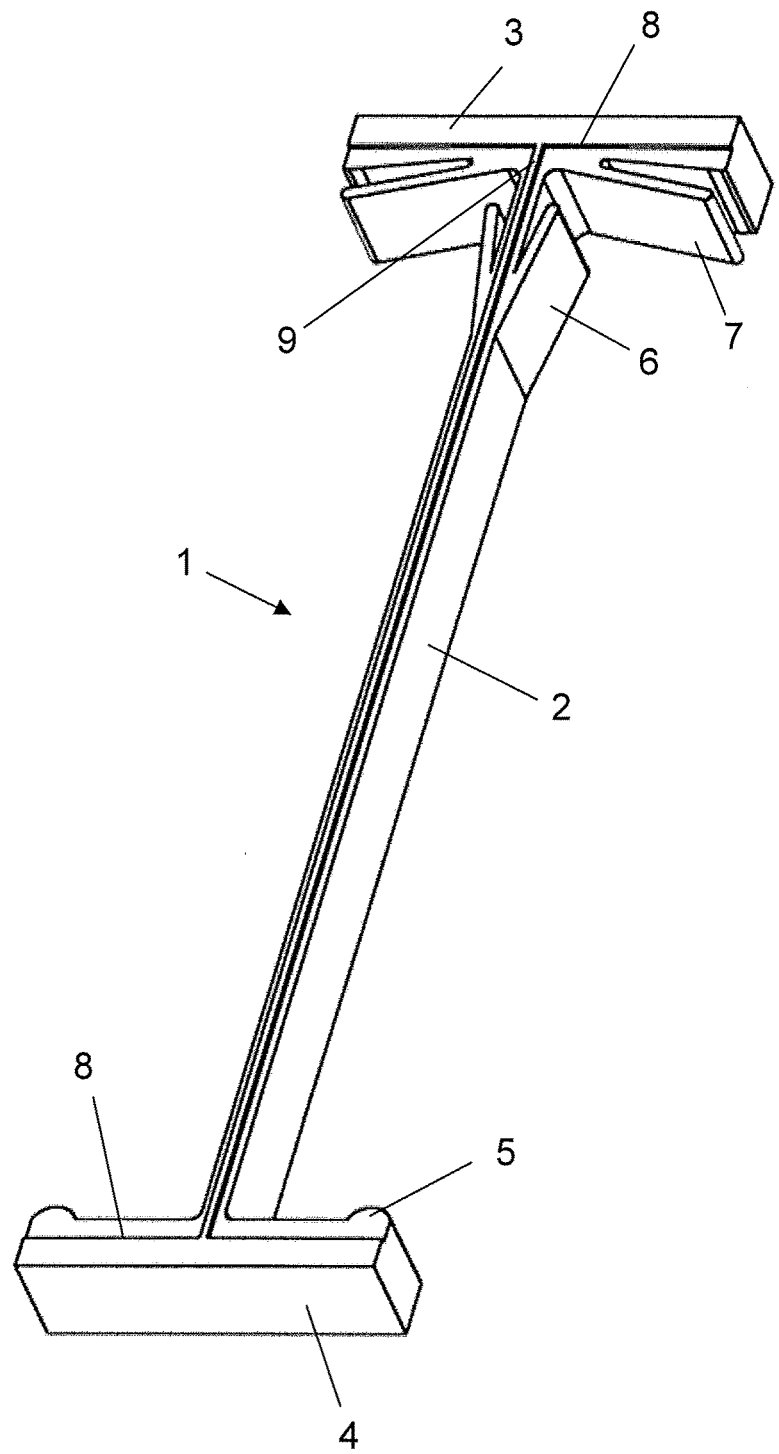
FIG. 1 is a perspective view of a protective device for the magnets of a synchronous motor.
Figure 2:
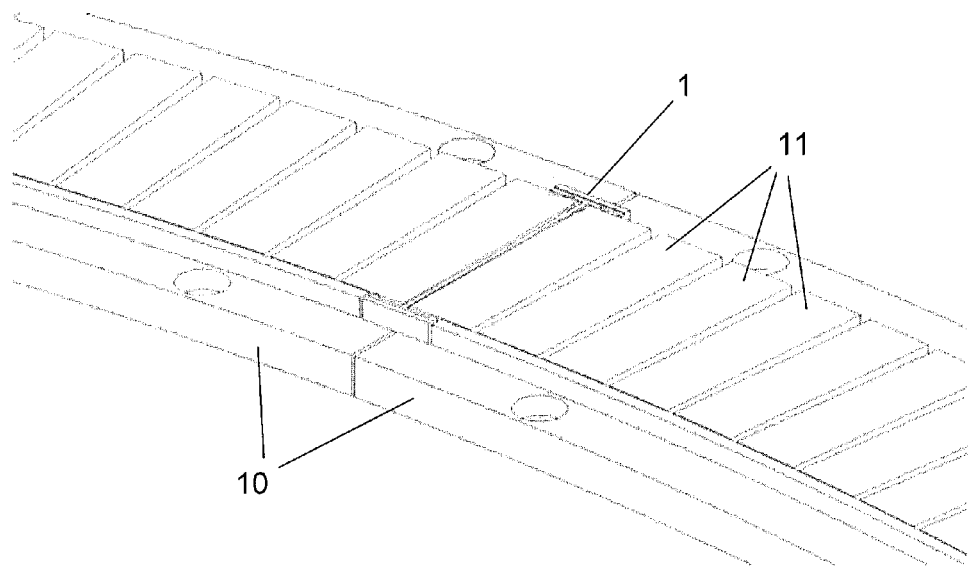
FIGS. 2 to 5 illustrate various mounting arrangements of the protective device.

FIG. 1 is a perspective view of a protective device 1 for the magnetic path of a synchronous motor. FIG. 2 illustrates the protective device 1 in a typical mounting situation in a linear motor. The protective device in the form of a double-T structure, which may be produced as an injection-molded part, is inserted between magnets 11 that are disposed on a magnet support 10 and form the magnetic path of the linear motor.

Protective device 1 includes a web 2 that is inserted into the gap between two magnets 11. Arranged at the two ends of web 2 are two flanges 3, 4 projecting at right angles on both sides of web 2. These flanges rest against the outer edges of magnets 11 exposed on both sides of the magnetic path.

Integrally molded on web 2 are first spring elements 6, which are arranged to center web 2 in the gap between two magnets 11. In this manner, protective device 1 may be used in magnetic paths whose magnets 11 have different spacings, where the gap between two magnets 11 is thus also of different size.

This also holds true if the magnetic path is curved in its plane, and the gap between magnets 11 is thus V-shaped. Web 2 must then be thin enough that it fits at the narrowest point (e.g., at the inner radius of a curved magnetic path) between magnets 11. First spring elements 6 center the web in the wider areas of the gap.

In this manner, a wide range of radii of curvature of magnetic paths is able to be covered using a protective device 1. Tolerances in the placement of magnets 11 or in their dimensions may also be offset. In addition, by the compression of magnets 11, their stability is increased.

Alternatively, the centering function of first spring elements 6 may also be provided by web 2 itself, if it is made of an elastically compressible material, and thereby itself becomes a spring element.

For protective devices 1 that are used in linear motors without curvature in the magnetic path, additional spring elements 6 may be provided, which are distributed along web 2.

First flange 3 has second spring elements 7 on its side facing the outer edge of magnets 11. These second spring elements 7 provide for reliable retention of protective device 1 on magnets 11, and compensate for small variations in the dimensions of magnets 11 transversely to the direction of the magnetic path.

Projections 5 facing the outer edges of magnets 11 are integrally molded on second flange 4. These projections 5 provide for a defined contact between second flange 4 and magnets 11, that is, for example, irrespective of the radius of curvature of the magnetic path.

Figure 3:
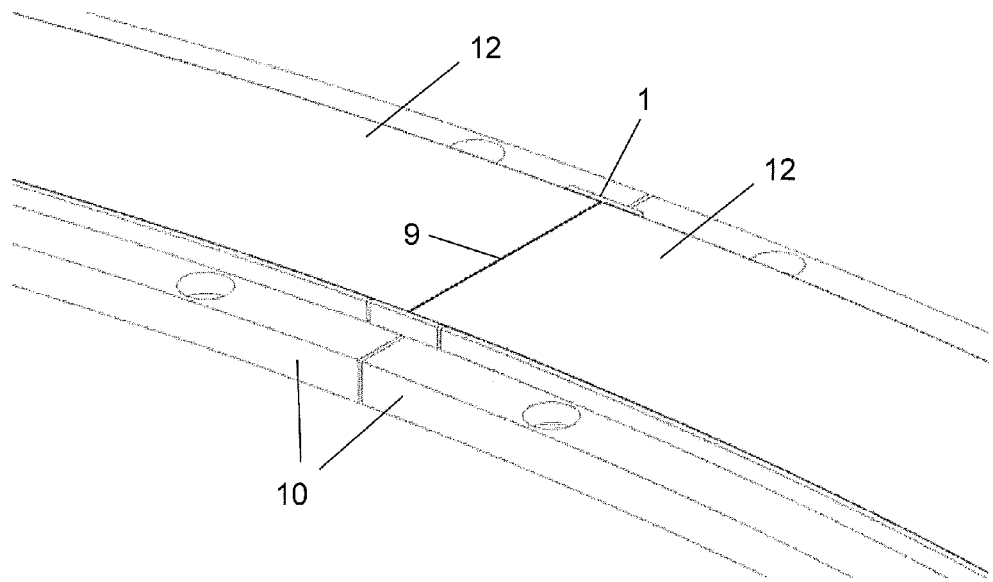
Figure 5:
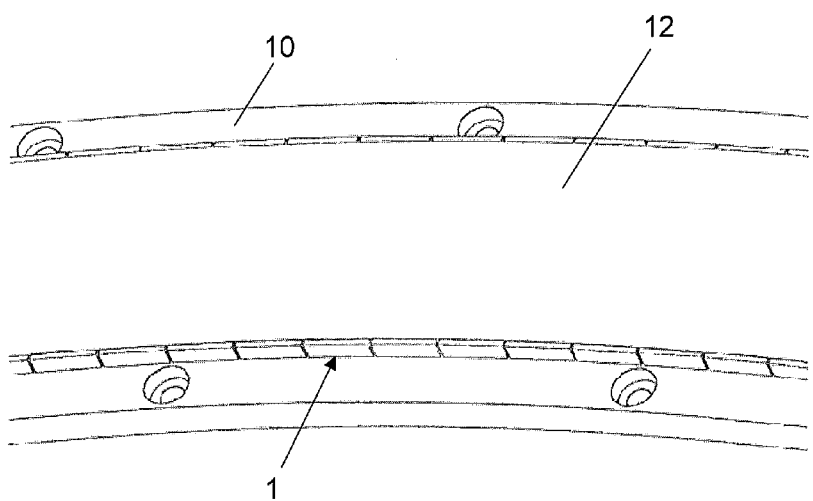
Figure 7:
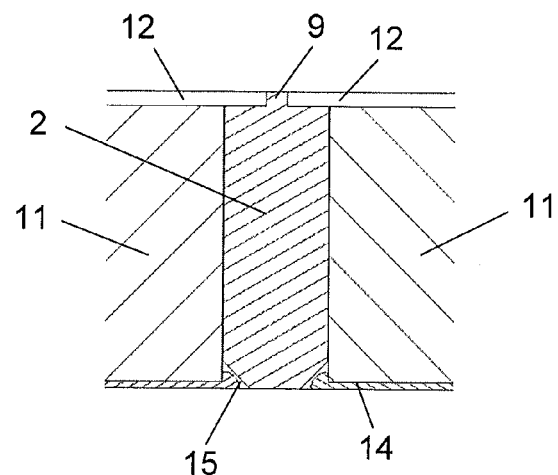
FIG. 7 is a cross-sectional view through a protective device.

First and second flanges 3, 4 each have an edge 8, the edges together serving as or forming a channel for accommodating a cover, as is, for example, conventional and as shown additionally in FIGS. 3, 5, and 7. In each case, edge 8 is formed such that protective device 1 is lower on the side of edge 8 facing magnets 11 than on the other side of edge 8. The cover is thus guided, and injuries at sharp edges of the cover are avoided.

On the upper side of web 2, a ridge 9 is integrally molded that provides for a defined stop for the butt joint of two covers of the magnetic path. This is described again in greater detail below with reference to FIG. 7.

In FIG. 2, it is shown that a protective device is disposed between two magnets 11, which are on both sides of an abutting surface at which two magnet supports 10 abut against each other. Otherwise, magnets 11 are protected by a laterally disposed cover strip.

In FIG. 3, magnets 11 are covered with a cover 12, for example, with a thin ferromagnetic sheet metal, which is retained by the attractive force of magnets 11. Ridge 9 of protective device 1 can be seen between the two covers.

If protective device 1 is produced from a compressible material, it may be made somewhat higher than magnets 11. Due to the force with which cover 12 is drawn toward magnets 11, protective device 1 is compressed to the correct height corresponding to magnets 11.

FIGS. 2 and 3 illustrate a slight curvature of the magnetic path in the plane of the magnetic path, which leads to a V-shaped formation of the gap between two magnets 11, as described above.

However, the magnetic path may also be curved, such as in the case of a rotary synchronous motor, where magnets 11 are situated on the inside or outside of a cylinder. V-shaped gaps are formed between the magnets, as well, the distance between magnets 11 varying in a direction perpendicular to the plane of the magnetic path. The protective device may also be inserted into such gaps, if it is made of a sufficiently compressible material.

Figure 4:
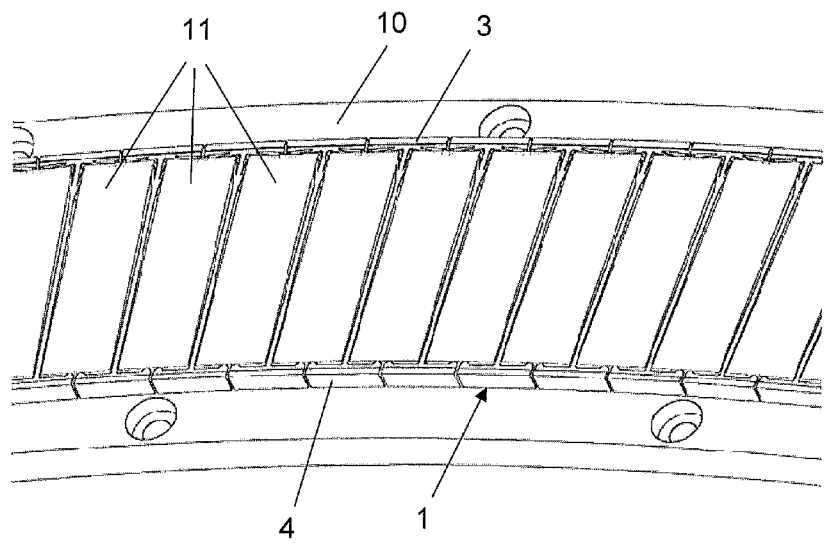

FIG. 4 illustrates a magnetic path in which a protective device is inserted between all magnets 11. An uninterrupted lateral protection is formed for magnets 11 by butt-jointed flanges 3, 4. A separate assembly of such a protection, such as in conventional devices, is therefore not necessary. Due to edges 8 on flanges 3, 4, a channel is also formed into which cover 12 may be inserted, as illustrated in FIG. 5. Rdige 9, which serves as an abutting surface between two covers 12, is only necessary in this configuration where two covers 12 abut against each other.

Figure 6:
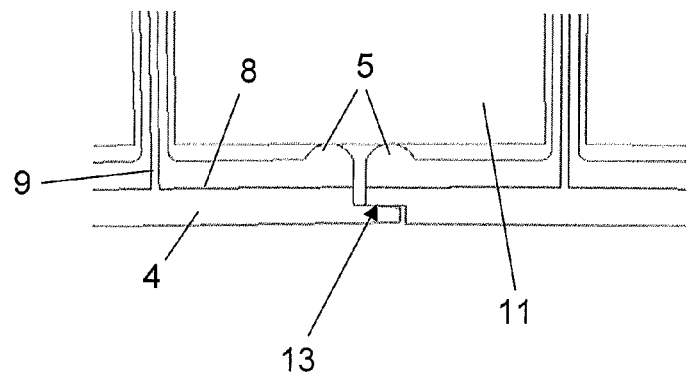
FIG. 6 is a detail view of overlapping protective devices.

FIG. 6 illustrates an enlarged area of second flange 4. FIG. 6 illustrates projections 5, with which second flange 4 abuts against magnets 11, edge 8, against which cover 12 rests, and ridge 9 as an abutting surface between two covers 12.

In addition, it is shown that adjacent second flanges 4 overlap. To that end, in an overlapping region 13, second flanges 4 have areas corresponding to one another, in which the individual flange is made thinner, the two overlapping areas complementing one another to form a thickness which each flange also has outside of overlapping region 13. Intrusion of dirt between magnets 11 may be better prevented by this overlapping. The form of the overlapping areas of the second flanges illustrated is an example. Other forms are possible, such as, for example, chamfers corresponding to one another or tongue-and-groove structures. However, the example illustrated has the advantage that the distance between flanges 3, 4 of individual protective devices 1 is able to change (especially increase), without a void developing. This is advantageous in the case of curved magnetic paths at the outer radius.

The same or similar overlapping may also be provided for first flanges 3.

FIG. 7 is a cross-sectional view through protective device 1, which is inserted between two magnets 11. A notch 15 is illustrated in the form of a chamfer at both sides of web 2, and specifically, at its lower side facing magnet support 10. Forms other than a simple chamfer are possible. Space is thus provided for excess adhesive 14, which emerges laterally from magnets 11 when mounting magnets 11 on support 10.

In addition, on the upper side of web 2, a ridge 9 is illustrated, its function as defined abutting surface between two covers 12 is apparent.

Figure 8:
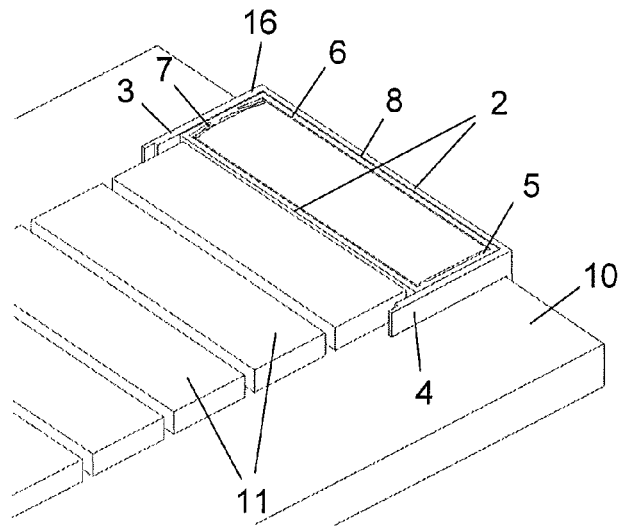
FIG. 8 illustrates a special protective device for the last magnet of a magnetic path.

Since protective device 1 described is only able to be inserted between two magnets 11, an end piece 16 is provided for respective first and last magnets 11 of the magnetic path of a linear motor, as illustrated in FIG. 8. It should be noted that rotary motors and linear motors having curved areas and a path closed upon itself do not need an end piece 16.

An end piece 16 encloses the edges of a magnet 11 completely. Instead of one web 2, end piece 16 has two webs. On the sides facing magnets 11, these webs have first and second spring elements 6, 7, as well as a first and second flange 3, 4 that in each case partially protect the adjacent magnet. Overlapping regions 13 with adjacent protective devices 1 are also provided.

Edges 8 of flanges 3, 4 are continued on external additional web 2, which protects last magnet 11 at the end face of the magnetic path, so that a cover 12 is able to abut and be supported there after last magnet 11. Bending of cover 12 about the edge of the last magnet is therefore superfluous. Cover 12 also is unable to slip out of place.

To even better prevent cover 12 from slipping out of place, on the upper side of protective devices 1, noses may be integrally molded, which project into corresponding openings in cover 12. However, the advantage of the additional fixation of cover 12 must be weighed against the decrease in the protection of magnets 11 accompanying it.

What is claimed is:

1. A secondary part of a synchronous motor, comprising:
   a magnet support;
   a plurality of magnets evenly spaced on the magnet support; and
   a protective device having a web inserted into a gap between adjacent magnets, the web having a first flange at a first end and a second flange at a second end, the web and the flanges forming a double-T structure, the flanges resting against outer edges of the adjacent magnets.

2. The secondary part according to claim 1, wherein the web includes or functions as a first spring element to center the web in the gap between the adjacent magnets.

3. The secondary part according to claim 1, wherein the first flange includes a second spring element that clamps the protective device on the magnets with a force transversely to a magnetic path and compensates for variations in a length of the magnets transversely to the magnetic path.

4. The secondary part according to claim 1, wherein the second flange includes projections that form defined contact points on outer edges of the magnets.

5. The secondary part according to claim 1, wherein each of the flanges includes an edge, the edges together forming a channel to accommodate a cover of the magnets.

6. The secondary part according to claim 1, wherein on an upper side facing away from the magnet support, the web includes a ridge arranged as a stop for two covers.

7. The secondary part according to claim 1, wherein the flanges of two adjacent protective devices touch each other and form an uninterrupted protection for external edges of the magnets.

8. The secondary part according to claim 7, wherein the flanges of two adjacent protective devices overlap in an overlapping region.

9. The secondary part according to claim 8, wherein the overlapping region is formed such that no voids form in response to a change in distance between the flanges.

10. The secondary part according to claim 1, wherein on a lower side facing the magnet support, the web has a notch adapted to receive excess adhesive.

11. The secondary part according to claim 1, wherein the motor is arranged as a rotary motor.

12. The secondary part according to claim 1, wherein the motor is arranged as a linear motor.

13. The secondary part according to claim 1, wherein the motor is arranged as a linear motor including at least one curved portion.

14. A motor, comprising:
    a secondary part, including:
       a magnet support;
       a plurality of magnets evenly spaced on the magnet support; and
       at least one first protective device having a web inserted into a gap between adjacent magnets, the web having a first flange at a first end and a second flange at a second end, the web and the flanges forming a double-T structure, the flanges resting against outer edges of the adjacent magnets.

15. The motor according to claim 14, wherein the motor is arranged as a linear motor, the motor further comprising at least one second protective device including a first web, a second web, a first flange at a first end, and a second flange at a second end, the webs and flanges of the second protective device enclosing an end magnet, the first web inserted in a gap between the end magnet and an adjacent magnet.

* * * * *